Oct. 21, 1958 J. L. CARROLL 2,857,060
MECHANICAL AUTOMOBILE PARKING GARAGE
Filed Oct. 17, 1957 3 Sheets-Sheet 1
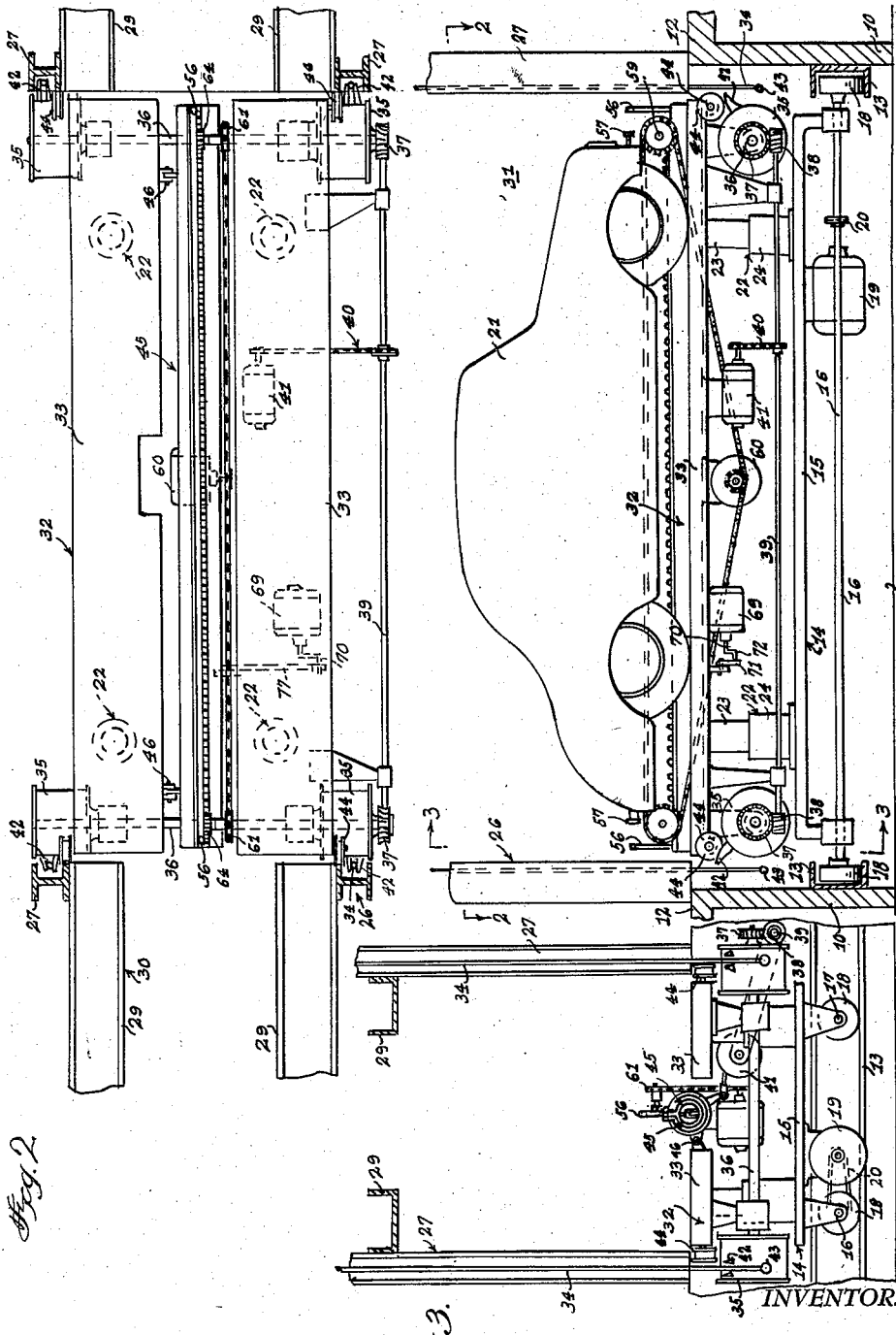
INVENTOR.
JAMES L. CARROLL
BY Victor J. Evans & Co.
ATTORNEYS

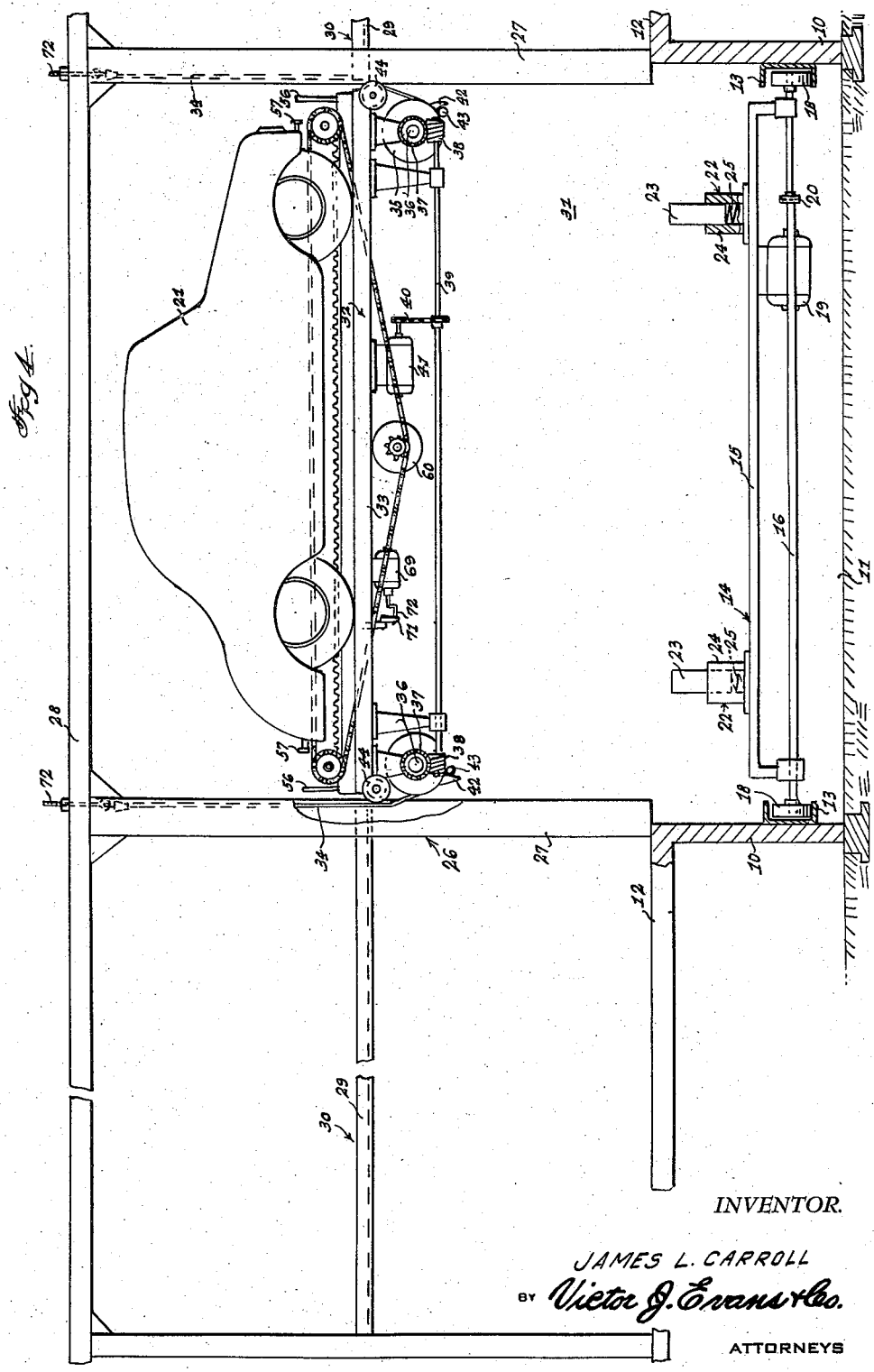

Oct. 21, 1958    J. L. CARROLL    2,857,060
MECHANICAL AUTOMOBILE PARKING GARAGE
Filed Oct. 17, 1957    3 Sheets-Sheet 3
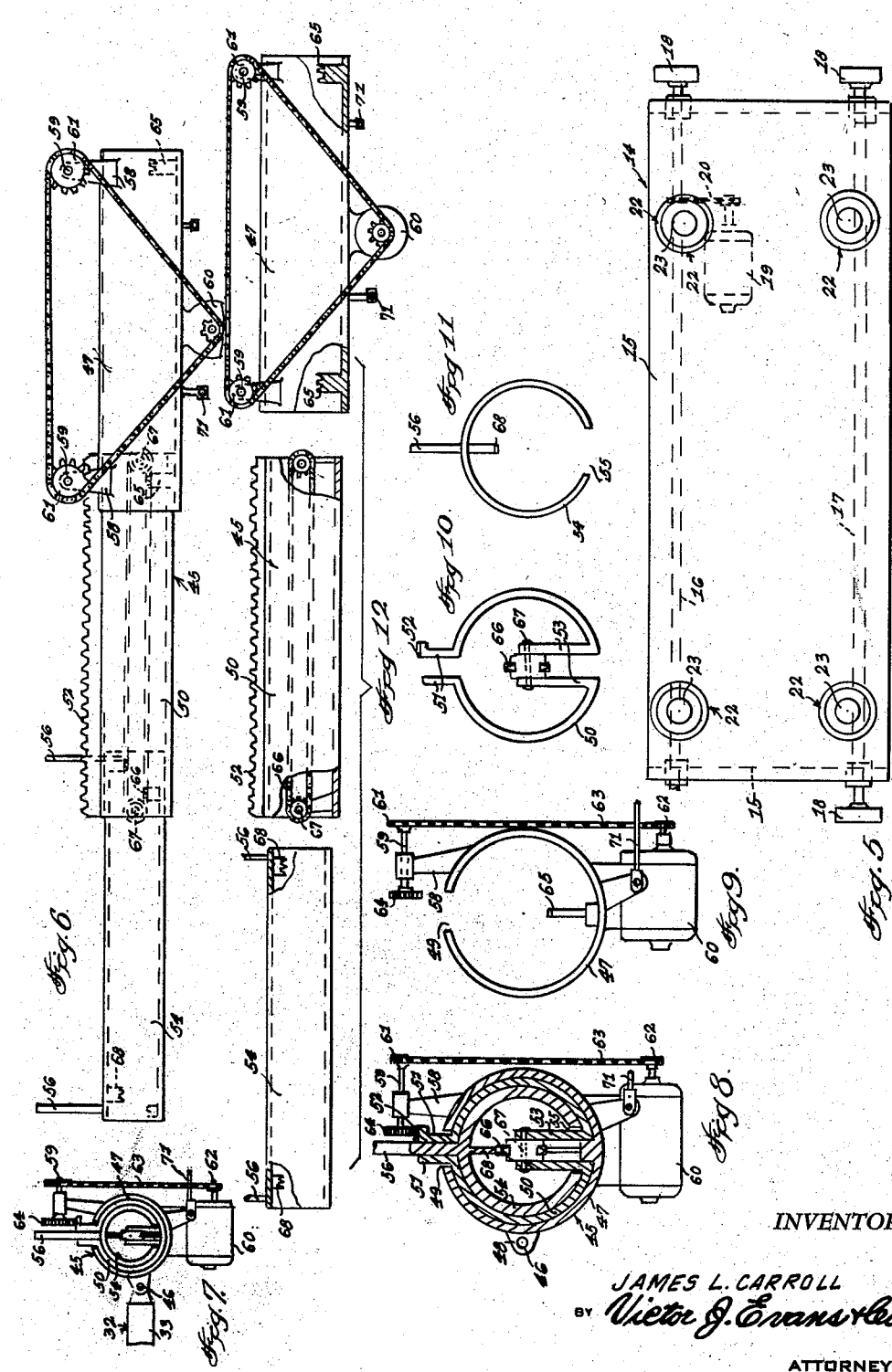
INVENTOR.
JAMES L. CARROLL
BY Victor J. Evans & Co.
ATTORNEYS

2,857,060
Patented Oct. 21, 1958

2,857,060

MECHANICAL AUTOMOBILE PARKING GARAGE

James L. Carroll, Indianapolis, Ind.

Application October 17, 1957, Serial No. 690,730

3 Claims. (Cl. 214—16.1)

This invention relates to a parking garage or apparatus, and more particularly to an apparatus for use in automatically parking a plurality of vehicles.

The object of the invention is to provide a vehicle parking garage which includes a means for moving vehicles to the proper position so that the vehicles can be conveniently positioned in stalls, whereby a plurality of vehicles can be readily stored or parked in a compact area.

Another object of the invention is to provide a parking garage which includes a carriage that is adapted to receive a vehicle to be parked, and wherein the carriage is adapted to be moved laterally or horizontally in a pit, so that the vehicle can be moved to the proper location, and wherein after the carriage has been moved to the proper location, an elevator is actuated so that the vehicle is moved to the proper height or elevation and wherein after the vehicle reaches the proper elevation, a means is provided which can be actuated for pushing or moving the vehicle off of the elevator into an empty stall.

A still further object of the invention is to provide a parking garage that includes a framework which is provided with a plurality of stalls or vehicle storage areas, and wherein there is provided a means which can be readily actuated so that the vehicles to be parked can be readily moved into or out of the stalls so that a plurality of vehicles can be quickly and easily handled or moved from a remote location.

A further object of the invention is to provide a vehicle parking garage which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view showing a portion of the parking garage, and with parts broken away and in section, and showing a vehicle in lowered position.

Figure 2 is a sectional view taken on the line 2—2 of Figure 1 and looking down on the elevator.

Figure 3 is a sectional view taken on the line 3—3 of Figure 1.

Figure 4 is a view similar to Figure 1, but showing the vehicle raised as when the elevator moves up.

Figure 5 is a plan view of the carriage which moves laterally or horizontally in the pit.

Figure 6 is a side elevational view of the pusher mechanism for use in moving vehicles from the elevator into the stalls or from the stalls onto the elevator.

Figure 7 is a transverse sectional view taken through the pusher mechanism.

Figure 8 is an enlarged transverse sectional view of the pusher mechanism.

Figure 9 is an end elevational view showing the housing and associated parts which form part of the pusher mechanism.

Figure 10 is an end elevational view of the casing which forms part of the pusher mechanism.

Figure 11 is an end elevational view of the sleeve which forms part of the pusher mechanism.

Figure 12 is a side elevational view of the pusher mechanism, showing the sleeve, casing and housing separated from each other for clarity.

Referring in detail to the drawings, the numeral 10 designates each of a pair of spaced parallel vertically disposed wall members which define a pit 11 therebetween, and the numeral 12 may indicate a ramp which is at ground level. Arranged contiguous to each of the wall members 10 is a U-shaped channel member 13, and the channel members 13 are horizontally disposed. The numeral 14 indicates a carriage which is mounted for lateral or horizontal movement in the pit 11, and the carriage 14 includes a rectangular platform 15, Figure 5. The carriage 14 is adapted to support an elevator as later described in this application, and the carriage 14 includes a pair of spaced parallel shafts 16 and 17 which are mounted below the platform or base 15. Rollers 18 are mounted on the ends of the shafts 16 and 17, and the rollers 18 are mounted for travel in the channel members 13. A motor 19 is supported below the base 15 of the carriage 14, and the motor 19 is connected to the shaft 16 through the medium of a suitable drive mechanism such as the chain and sprocket mechanism 20. Thus, by actuating the motor 19, the chain and sprocket mechanism 20 will drive the shaft 16 and this in turn will rotate the rollers 18 on the end of the shaft 16 so that the carriage 14 will move horizontally or laterally through the pit 11. The numeral 21 indicates a vehicle which is adapted to be handled by the parking garage of the present invention, it being understood that a plurality of vehicles are adapted to be parked or handled.

Extending upwardly from the carriage 14 and secured thereto is a plurality of support members 22 which act as shock absorbers for the elevator. The support members 22 each include an outer member 24 which has a post 23 extending upwardly therefrom, and a spring member 25 is arranged within the member 24 below the post 23.

The parking garage of the present invention further includes a framework which is indicated generally by the numeral 26, and the framework 26 includes a plurality of vertically disposed beams 27 which each have an H-shape in cross section. The framework 26 further includes top rails 28, and secured to the beams 27 and extending outwardly therefrom is a plurality of spaced parallel tracks 29 which may be U-shaped in cross section. The tracks 29 are arranged in pairs and the pairs of tracks 29 define stalls 30 for receiving the vehicles 21 which are to be parked.

The framework 26 is constructed or arranged so as to define a space 31 whereby an elevator 32 can move upwardly through the space 31, and the elevator 32 is adapted to be used for lifting the vehicle 21 or lowering the vehicle 21 when the vehicle is being removed from a particular stall.

As shown in Figure 2, the elevator 32 includes a pair of spaced parallel elongated platforms 33 which are arranged in spaced apart relation with respect to each other. The numeral 34 designates each of a plurality of vertically disposed cables which have their upper ends anchored to the top rails 28 of the framework 26. The cables 34 are adapted to be wound onto drums 35, and it will be seen that the elevator 32 is provided with four of the rotary drums 35. A pair of spaced parallel shafts 36 are provided for rotating the drums 35, and the shafts 36 have gears 37 on an end thereof which are adapted to be engaged by worms 38. The worms 38 are mounted on an end of a shaft 39, and the shaft 39 is rotated by means of a chain and sprocket mechanism 40 which is actuated by means of a motor 41. It is to be understood that the various motors are of the reversible type so that the parts which move can be moved in either of several directions.

Mounted on the lower end of each of the cables 34 is a ball or bushing 43, and bifurcated members or fork-like members 42 project outwardly from each of the drums 35 so that when the drums 35 rotate in the proper direction, the fork-like members 42 will engage the balls 43 so as to start to wind the cables 34 onto the drums. These cables are adapted to be arranged so that with the parts in the position of Figure 1 for example, it will be seen that when the drums 35 rotate in the proper direction, the cables 34 will be engaged by the fork-like members 42, so that the cables will wind onto the drums 35 whereby the effective length of the cables 34 will become shorter and this will cause the elevator 32 to move upwardly and since the vehicle 21 is supported on the elevator 32, it will be seen that the vehicle will be raised to the desired height or elevation. The pulleys 44 are adapted to be used for being sure that the elevator 32 remains always in alignment with the stalls in ascent or descent. This is necessary because a high wind could cause the elevator to sway being supported only by long free cables. The elevator is held in alignment by the grooved outer rim of the pulley 44 straddling one leg of the H-beam 27. Thus, with four pulleys 44 riding against the four H-beams 27, one at each corner of the elevator, the elevator will ascend and descend without sway and it will be held firmly on the tracks. The elevator can move horizontally in the pit, when freed of the cables, because the pulleys 44 are slightly below the lower end of the H-beams 27 when the elevator comes to rest on the carriage 14. It is not believed necessary to provide a guide for the cable being wound onto the drums.

There is further provided a pusher mechanism which is indicated generally by the numeral 45, and the pusher mechanism 45 is adapted to be used for moving the vehicle 21 from the elevator 32 into one of the stalls 30, or for moving the vehicle from a particular stall 30 onto the elevator 32. The pusher mechanism 45 is shown in detail in Figures 6–12, and it will be seen that the pusher mechanism 45 is pivotally connected to one of the platforms 33 of the elevator 32 as at 46, and this pivotal arrangement is shown in Figure 7 and permits the various parts of the pusher mechanism to selectively tilt or move.

The pusher mechanism 45 includes an outer housing 47 of generally cylindrical formation, and the housing 47 has ears 48 extending outwardly therefrom whereby the pivotal connection at 46 can be effected. The housing 47 further includes an open space 49 adjacent the upper end thereof, Figure 9. The numeral 50 indicates a casing which is telescopically or slidably mounted in the housing 47, and the casing 50 includes a pair of upstanding ears 51. A plurality of teeth 52 are arranged along the upper edge of one of the ears 51 so as to define a rack for a purpose to be later described. Extending upwardly from the lower portion of the casing 50 is a pair of spaced parallel lugs 53, Figure 10.

In Figure 11 there is shown the sleeve or inner member 54 which is telescopically mounted in the casing 50, and the sleeve 54 is provided with an opening 55 in the lower portion thereof. Extending upwardly from the sleeve 54 is a pair of spaced parallel posts 56 which are adapted to engage the bumpers 57 of the vehicle 21 whereby the vehicle 21 can be readily pushed onto or off of the elevator 32 or into and out of the stalls 30.

Extending upwardly from the housing 47 and secured thereto are arms 58, and the arms 58 support stub shafts 59, Figure 8. A sprocket 61 is mounted on each of the stub shafts 59, and a sprocket 62 is driven by a motor 60 which is mounted below the housing 47. An endless chain 63 is trained over the sprockets 62 and 61 so that when the motor 60 is actuated, the shafts 59 will be rotated.

As shown in the drawings, the pusher mechanism 45 is positioned in the space between the platform 33 of the elevator 32. Connected to the stub shafts 59 are pinion gears 64 which mesh with the teeth 52 on the ear 51 of the casing 50, so that as the shafts 59 rotate, the pinion gears 64 will cause movement of the casing 50 into and out of the housing 47, depending upon the direction of rotation of the motor 60. Body members 65 extend upwardly from the lower portion of the housing 47, Figure 9, and the body members 65 have teeth on their upper ends for engagement with an endless chain 66. The chain 66 is positioned in the casing 50 and is mounted on guide sprockets 67. As shown in Figure 12, other toothed body members 68 depend from the upper portion of the sleeve 54, and the teeth of the body members 68 also engage the chain 66. This construction serves to cause telescoping movement of the sleeve 54 and casing 50 into and out of the housing 47 as the motor 60 is actuated whereby the posts 56 can engage the front and rear bumpers 57 of the vehicle 21 so as to push or move the vehicle forwardly or rearwardly whereby the vehicle can be positioned or placed in its proper or desired location.

There is further provided a means for tilting the pusher mechanism 45 so that the bars 56 can move down out of the way of the vehicle bumpers or axles when the vehicle is moved onto or off of the elevator. This tilting mechanism for the pusher means 45, comprises a motor 69 which is mounted beneath the elevator 32, and the motor 69 serves to operate a crank 70 which is connected to the housing 47 through the medium of linkage 71. Thus, by actuating the motor 69, the crank 70 will be moved and this will move the linkage 71 whereby the housing 47 and the entire pusher mechanism 45 will pivot about an axis extending through the point 46 so that the bars 56 can tilt downwardly so as to provide sufficient clearance whereby the vehicle 21 can move onto or off of the elevator. It is to be noted that the vehicle is moved with the pusher mechanism in an upright position so that the parallel posts 56 are upright and in a position to engage the bumpers. The mechanism 45 is tilted or laid on its side only when moving under the vehicle or when retrieving the vehicle or when moving back onto the elevator after placing a vehicle in the stall. The members 56 are adapted to be in a down position so that the vehicle can drive in onto the device at a lower level under its own power. When the elevator is raised, the members 56 can be selectively raised or tilted to a vertical position as shown in Figure 4 so that when the car is on upper levels, the car can be moved from left to right or vice versa as shown in Figure 4.

From the foregoing, it is apparent that there has been provided a parking garage wherein a plurality of vehicles such as the vehicles 21 can be conveniently handled. In use, with the parts arranged or constructed as shown in the drawings, it will be seen that when a vehicle such as the vehicle 21 is to be parked, the vehicle 21 is driven onto the elevator 32 so that the vehicle 21 assumes the position shown in Figure 1. Then, the motor 19 is actuated and actuation of the motor 19 causes rotation of the shaft 16 through the medium of the chain and sprocket mechanism 20. As the shaft 16 rotates, the rollers 18 on the ends of the shaft 16 will rotate and these rollers 18 will travel in the channel members 13 which are arranged contiguous to the inner surface of the wall members 10. This movement or rotation of the rollers 18 causes lateral or horizontal travel of the carriage 14 through the pit 11 so that the vehicle 21, elevator 32, and carriage 14 can be positioned in any desired location in the pit 11 and depending upon the stall that is to be loaded with the vehicle. After the carriage 14 reaches the desired position, the motor 19 may be stopped so as to arrest further movement of the carriage 14. Then, the motor 41 can be actuated and this rotates the shaft 39 through the chain and sprocket mechanism 40. As the shaft 39 rotates, the pair of worms 38 will rotate the gears 37 and this will cause rotation of the shafts 36. Each of the shafts 36 has a pair of the drums 35 mounted thereon, so that as the drums 35 rotate, the fork members 42 will travel around and engage the balls 43 on the lower ends of the cables 34 and this will cause the cables 34 to become wound on the drums 35. Thus, the effective length of the cables 34 will be shortened whereby the elevator 32 will move from the position shown in Figure 1 to the position shown in Figure 4 whereby the vehicle 21 will be elevated. After the vehicle 21 has been raised to the desired elevation, the motor 41 can be stopped, as for example when the vehicle 21 is in alignment with an empty stall 30. The bars 56 of the pusher mechanism 45 are arranged in engagement with the front and rear bumpers 57 of the vehicle 21 so that the pusher mechanism can be used for moving the vehicle 21 from the elevator 32 onto the tracks 29 of the stall 30.

To actuate the pusher mechanism 45, the motor 60 is actuated and this rotates the sprocket 62 which in turn drives the sprocket 61 through the medium of the chain 63. As the sprockets 61 turn, they rotate the stub shafts 59, and as previously described, the stub shafts 59 carry the pinion gears 64 which mesh with the teeth 52 on the ear 51 of the casing 50. Thus, this rotation of the pinion gears 64 will cause the casing 50 to telescope or move outwardly from the housing 47. As the casing 50 moves outwardly from the housing 47, it will be seen that the endless chain 66 engages the body members 65 on the lower portion of the housing 47, and also the body members 68 which are on the upper portion of the sleeve 54 engage the chain 66, and this causes the sleeve 54 to telescope out of the casing 50 so that the parts can be moved to the position shown in Figure 6 for example. This outward movement of the sleeve 54 causes the pair of bars 56 to move and since the bars 66 engage the bumpers 57 of the vehicle 21, it will be seen that actuation of the motor 60 can be used for moving the vehicle 21 from the position shown in Figure 4 to a position into one of the stalls 30. Similarly, the bars 56 can be used for returning the vehicle 21 from a stall 30 back onto the elevator 32.

The bars 56 and associated parts are adapted to be selectively tilted or moved to an out of the way position by a means which comprises the motor 69 which serves to operate the linkage 71 which is connected to the mechanism 45, the mechanism 45 being pivotally connected to the elevator 32 as at 46.

It is to be understood that the reverse procedure is used when vehicles are being returned from the stalls to a position as shown in Figure 1 as for example when the vehicles are being returned to the owners or drivers thereof.

By means of the present invention, a plurality of vehicles can be easily and quickly handled and wherein the vehicles can be parked in a compact structure and wherein a minimum amount of employees are required to operate the garage or apparatus, and wherein the entire mechanism may be operated from a remote location. The parts can be made of any suitable material and in different shapes or sizes.

Furthermore, if desired a suitable ramp can be provided whereby the vehicle can be driven up such a ramp and onto the elevator. Furthermore, a third rail method can be used for powering or operating the various motors, and suitable insulation could be used in the event that a third rail arrangement was provided. Also, spring loaded drums may be used when the cables are being unwound. The various motors may be controlled from a central control panel, and by means of the present invention vehicles such as automobiles can be mechanically parked in bins or stalls and wherein the parts may be constructed of a suitable material such as steel beams. The stalls are adapted to be lined up so that they face a center aisle and these stalls are arranged one above the other as high as desired. The vehicles are conveyed down the center aisle on a dolly or carriage and are raised to the designated stall by means of an elevator. The vehicles are rolled into the stalls by the mechanical pushing mechanism previously described.

The stalls are adapted to be arranged so that they face each other along a center aisle and the trays or tracks 29 support the automobile being parked. The vehicles are conveyed along the center aisle 31 by means of the conveyor and elevator. The elevator raises the vehicle to the proper stall and the elevator includes the previously described cables and drums. At rest, the drums are free of the cables so that the elevator can move horizontally without touching any of the cables, and in order to prevent the cables from swinging and in order to insure that they will always be in proper position to be grasped by the fork-like members, a spring clip may be provided. The pulleys 44 help prevent sway of the elevator.

The pusher mechanism 45 is essentially an expandable tube arrangement and when the tube assembly is expanded in either direction, the vehicle will move in that same direction since it will be pushed by the rods 56, and by means of the pusher mechanism the vehicles can be inserted or extracted from the stalls on either side of the elevator since the pusher mechanism will expand in either direction. Where necessary, suitable safety devices and automatic controls may be used and such safety devices and automatic controls may be of conventional construction. The elevator 32 rests on the support members 22 above the carriage 14 when the parts are in the position shown in Figure 1.

I claim:

1. In a vehicle parking apparatus, spaced parallel wall members defining a pit therebetween, a pair of spaced parallel horizontally disposed U-shaped channel members arranged contiguous to the inner surfaces of said wall members, a carriage mounted for horizontal movement in said pit and said carriage including a horizontally disposed movable base, a first pair of spaced parallel shafts supported below said base, rollers connected to the ends of said shafts and positioned in said channel members, a first motor mounted below said base for rotating at least one of said shafts to cause said carriage to move laterally in said pit, a plurality of support members extending upwardly from said base, a framework including a plurality of vertically disposed beams which are H-shape in cross section, said framework further including horizontally disposed top rails, and a plurality of horizontally disposed tracks secured to said beams and said tracks being arranged in pairs and defining a plurality of stalls for receiving parked vehicles, a vertically movable elevator including a pair of spaced parallel horizontally disposed platforms, cables having their upper ends anchored to said top rails and portions of said cables extending contiguous to said H-shaped beams, a plurality of drums mounted below said elevator, forked members secured to said drums for engagement with said cables, a second motor mounted below said elevator for operating said drums, and a pusher mechanism for moving the vehicles from said elevator to said stalls or from said stalls onto said elevator, said pusher mechanism comprising a housing pivotally connected to one of the platforms of said elevator, a casing telescopically mounted in said housing, a sleeve telescopically mounted in said casing, parallel bars connected to said sleeve for engagement with the bumpers of the vehicle, arms extending from said housing, stub shafts supported by said arms, a third motor mounted below said housing, and a drive chain connecting said motor to said stub shafts.

2. In a vehicle parking apparatus, spaced parallel wall members defining a pit therebetween, a pair of spaced parallel horizontally disposed U-shaped channel members arranged contiguous to the inner surfaces of said wall members, a carriage mounted for horizontal movement in said pit and said carriage including a horizontally disposed movable base, a first pair of spaced parallel shafts supported below said base, rollers connected to the ends of said shafts and positioned in said channel members, a first motor mounted below said base for rotating at least one of said shafts to cause said carriage to move laterally in said pit, a plurality of support members extending upwardly from said base, a framework including a plurality of vertically disposed beams which are H-shape in cross section, said framework further including horizontally disposed top rails, and a plurality of horizontally disposed tracks secured to said beams and said tracks being arranged in pairs and defining a plurality of stalls for receiving parked vehicles, a vertically movable elevator including a pair of spaced parallel horizontally disposed platforms, cables having their upper ends anchored to said top rails and portions of said cables extending contiguous to said H-shaped beams, a plurality of drums mounted below said elevator, forked members secured to said drums for engagement with said cables, a second motor mounted below said elevator for operating said drums, and a pusher mechanism for moving vehicles from said elevator to said stalls or from said stalls onto said elevator, said pusher mechanism comprising a housing of cylindrical shape pivotally connected to one of the platforms of said elevator and said housing being provided with an opening in the upper portion thereof, a casing telescopically mounted in said housing and including a pair of spaced parallel ears extending through the opening in the upper portion of said housing, a plurality of teeth on one of said ears, said casing further including spaced parallel lugs extending upwardly from the lower portion of said casing, a sleeve telescopically mounted in said casing, a pair of spaced parallel bars extending upwardly from said sleeve for engagement with the bumpers of the vehicle, a pair of spaced apart arms extending upwardly from said housing, a pair of stub shafts supported by said arms, a third motor mounted below said housing, chain and sprocket means connecting said third motor to said stub shafts, pinion gears mounted on said stub shafts and meshing with the teeth on said ear, a first pair of spaced parallel toothed body members extending upwardly from the lower portion of said housing, an endless chain mounted in said casing for engagement with said toothed body members, and a second pair of toothed body members depending from the upper portion of said sleeve for engagement with said endless chain.

3. The structure as defined in claim 2, and further including means for tilting said pusher mechanism, said last named means comprising a fourth motor mounted below said elevator, a crank operated by said fourth motor, and linkage connecting said crank to said housing.

References Cited in the file of this patent

UNITED STATES PATENTS

| 1,468,147 | Frasier | Sept. 18, 1923 |
| 2,633,809 | Robinson et al. | Apr. 7, 1953 |
| 2,634,000 | Ulrich | Apr. 7, 1953 |
| 2,652,938 | Murphy | Sept. 22, 1953 |